(12) United States Patent
Togawa

(10) Patent No.: US 7,647,594 B2
(45) Date of Patent: Jan. 12, 2010

(54) PROCESSOR SYSTEM, TASK CONTROL METHOD ON COMPUTER SYSTEM, COMPUTER PROGRAM

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 840 days.

(21) Appl. No.: 10/485,007

(22) PCT Filed: Apr. 17, 2003

(86) PCT No.: PCT/JP03/04886

§ 371 (c)(1),
(2), (4) Date: Oct. 5, 2004

(87) PCT Pub. No.: WO03/100613

PCT Pub. Date: Apr. 12, 2003

(65) Prior Publication Data

US 2005/0039181 A1  Feb. 17, 2005

(30) Foreign Application Priority Data

May 28, 2002  (JP) ............................. 2002-154313

(51) Int. Cl.
*G06F 9/46* (2006.01)
*G06F 12/00* (2006.01)
(52) U.S. Cl. .................. 718/108; 718/107; 710/100
(58) Field of Classification Search ......... 718/100–108; 710/200
See application file for complete search history.

(56) References Cited

U.S. PATENT DOCUMENTS 5,339,425 A * 8/1994 Vanderah et al. ............ 718/102
5,428,779 A * 6/1995 Allegrucci et al. .......... 718/108
5,528,513 A * 6/1996 Vaitzblit et al. ............. 718/103
5,825,770 A * 10/1998 Coady et al. ................ 370/378
6,055,559 A * 4/2000 Shimizu et al. ............. 718/107
6,345,287 B1 * 2/2002 Fong et al. .................. 718/102
6,385,637 B1 * 5/2002 Peters et al. ................ 718/107

(Continued)

FOREIGN PATENT DOCUMENTS

| JP | 08-095807 | 4/1996 |
| JP | 8-95807 | 4/1996 |
| JP | 2003-131892 | 5/2003 |

OTHER PUBLICATIONS

Sha et al., "Priority Inheritance Protocols: An Approach to Real-Time Synchronization", IEEE Transactions on Computers, vol. 39, No. 9, pp. 1179-1185, Sep. 1990.
Kontothanassis et al., "Scheduler-conscious synchronization", ACM Transactions on Computer Systems, vol. 15, Issue 1, 1997.

(Continued)

*Primary Examiner*—Meng-Ai An
*Assistant Examiner*—Jennifer N To
(74) *Attorney, Agent, or Firm*—Finnegan, Henderson, Farabow, Garrett & Dunner, L.L.P.

(57) ABSTRACT

A mechanism for recording a timing in which a high urgency process is started is provided, and upon entry to a critical section in the middle of a low urgency process, by referencing the record, it is inspected whether a high urgency process will be started during execution of the critical section. If it will not be started, the critical section is entered, and if it will be started, control is exerted so that entry to the critical section is postponed until the high urgency process is completed. Exclusive access control in a critical section can be performed suitably under conditions where a plurality of task execution environments exist.

5 Claims, 6 Drawing Sheets

U.S. PATENT DOCUMENTS

| | | | |
|---|---|---|---|
| 6,708,197 B1 * | 3/2004 | Ryu et al. | 718/103 |
| 6,892,257 B2 * | 5/2005 | Grisenthwaite | 710/200 |
| 6,948,172 B1 * | 9/2005 | D'Souza | 718/106 |
| 7,165,252 B1 * | 1/2007 | Xu | 718/102 |
| 7,406,688 B2 * | 7/2008 | Shibayama et al. | 718/102 |
| 2001/0054055 A1 | 12/2001 | Bollella | |
| 2002/0124043 A1 * | 9/2002 | Otero Perez et al. | 709/107 |
| 2003/0154234 A1 * | 8/2003 | Larson | 709/107 |
| 2004/0098722 A1 * | 5/2004 | Funaki et al. | 718/103 |

OTHER PUBLICATIONS

Greenwald, "Non-blocking Synchronization and System Design", Ph.D. Thesis, Stanford University, pp. 1-11 and 38-156, 1999.

Communication Pursuant to Article 94(3) from European Patent Office in corresponding application dated Jun. 26, 2009 (4 pages).

* cited by examiner

US 7,647,594 B2

PROCESSOR SYSTEM, TASK CONTROL METHOD ON COMPUTER SYSTEM, COMPUTER PROGRAM

TECHNICAL FIELD

The present invention relates to a method of task control and computer program on a processing system or a computer system that provides a predetermined processing service by executing a program, and more particularly to a method of task control and computer program on a processing system or a computer system of the sort in which a plurality of flows of control (for example, an interrupt processing program and a normal processing program, or a plurality of tasks, etc.) exist.

In more detail, the present invention relates to a method of task control and computer program on a processing system or a computer system which performs exclusive access control in parts of a program (critical sections) that cannot be referenced simultaneously by a plurality of tasks. More particularly, the present invention relates to a method of task control and computer program on a processing system or a computer system which performs exclusive access control in critical sections of a program under circumstances where a plurality of task execution environments exist.

BACKGROUND ART

Along with the innovative advances in modern LSI (Large Scale Integration) technology, various types of information processing devices and information communication devices have been developed and sold, and have come to permeate our daily lives. With these types of devices, a variety of processing services are provided by having predetermined program code executed by a CPU (Central Processing Unit) or some other processor under an execution environment provided by an operating system.

However, in program design, it is sometimes useful to let a plurality of flows of control (sometimes referred to as "tasks") to exist in a program. As used herein, the term a plurality of flows of control refers to the fact that, as shown in FIG. 6, a plurality of "points currently under execution" exist in a program's process flow, or in other words in the flowchart. In the example shown in the same figure, at a certain point T1, step S1 and step S3 are executed in flow I and flow II, respectively. Then, as opposed thereto, at the next point T2 after some time has passed, step S2 and step S3 are executed in flow I and flow II, respectively.

In general, when a plurality of flows exist, and each of them manipulates data common to each, the consistency of data cannot be maintained unless they are synchronized. As used herein, common data includes task lists, conditional variables and the like. Conditional variable is a concept in which conditions a task has are made abstract, and is used as a means for communicating when a task should transition to a waiting state or when a task should return to an executable state.

For example, in a case where two flows of control B and C exist, a case where each flow of control performs the following process will be considered.

Procedure 1: Read the value of variable x
Procedure 2: Substitute into variable x a value in which 1 is added to the read value When the two flows B and C each perform the process above once, the same process ends up being performed twice. Therefore, the value of variable x should increase by two. However, when flow B and flow C coincide as follows, the value of variable x only increases by 1.
(1) Flow B executes procedure 1
(2) Flow C executes procedure 1
(3) Flow B executes procedure 2
(4) Flow C executes procedure 2

In order to prevent such an operational error, there is a need to prohibit the referencing and updating of data from other flows during a sequence of referencing and updating operations (transactions) performed in a certain flow.

In the example above, because flow C referenced and updated variable x before the sequence of operations in flow B, namely procedure 1 and procedure 2, was completed, a problem in which the consistency of data was lost occurred.

Such operations as procedures 1 to 2 described above could also be considered parts of a program which cannot be referenced simultaneously by a plurality of tasks, and will hereinafter be referred to as "critical sections." Also, prohibiting the referencing and updating of data by other tasks in order to solve the problem of data consistency in critical sections can also be called "exclusive access control." In other words, while a series of processes is performed with respect to some data in a flow of control, the act of operating on the same data by another flow of control is delayed, that is, operation of particular data is performed exclusively.

The present inventors consider it preferable that an exclusive access control mechanism have the following features.
(1) There is no possibility of having a high urgency process delayed by a low urgency process (of an occurrence of a reversal in priority).
(2) Exclusive access control can be performed even between a plurality of task sets whose scheduling is performed in accordance with distinct policies.

Of the features above, the reason (1) is necessary is obvious to those skilled in the art. Also, (2) is necessary in simultaneously running a plurality of operating systems on one computer system or in employing distinct scheduling methods for each of a plurality of task sets each having distinct characteristics.

For example, for exclusive access control between tasks, "mutex mechanisms" and "semaphore mechanisms" are used. However, in these methods employing such exclusive access control lies the problem that there is a possibility of having high priority processes delayed by low priority processes, that is a possibility of an occurrence of a reversal in priority, and therefore feature (1) above is not satisfied.

As a method for mitigating such a problem of reversal in priority, priority inheritance protocols (for example, see "Priority Inheritance Protocols: An Approach to Real-Time Synchronization" a paper by Lui Sha, Ragunathan Rajkumar and John P. Lehoczky, IEEE Transactions on Computers, Vol. 39, No. 9, pp. 1179-1185, September 1990) are proposed. Priority inheritance protocols refer to a method in which, in a case where a high priority task is trying to operate on the same data while a low priority task is executing a series of operations, the priority of the low priority task is temporarily raised to the same priority as the high priority task.

The operation of priority inheritance protocols is illustrated in FIG. 7. In this case, if high priority task B tries to start operating on some data while low priority task A is operating on the same data, a delay is inevitable. At this point, the priority of task A is temporarily raised to the same level as task B. Thereafter, even if task C that has a priority lower than task B but higher than task A tries to initiate execution, since the priority of task A is raised higher than task C, execution of task A is never interrupted. Then, after task A is finished, task B, while maintaining the consistency of the data, is able to initiate operation on the data without being interrupted by task C of a lower priority than itself.

However, this priority inheritance protocol is predicated on the idea that the scheduling of all tasks is performed in accordance with a common criterion, namely priority. Therefore, it is difficult to apply it to a system in which a plurality of scheduling co-exists (especially, a system in which a task set that does not perform scheduling in accordance with priority exists) such as a task execution environment in which a plurality of operating systems operate simultaneously on a single computer system, for example. In other words, feature (2) above is not satisfied.

As a method that does not entail these problems, the scheduler-conscious synchronization method may be given as an example (for example, see "Scheduler-conscious synchronization" a paper by Leonidas I. Kontothanassis, Robert W. Wisniewski, Michael L. Scott, (ACM Transactions on Computer Systems, Volume 15, Issue 1, 1997)). This method limits the effect a low urgency process has on a high urgency process by prohibiting other tasks from being dispatched during the execution of a critical section. Specifically, the delay time of a high urgency process is suppressed to below the maximum critical section execution time. Further, this method is predicated only on the presence of a mechanism for prohibiting dispatch.

However, since this method is not one that takes into account application to a system in which a plurality of scheduling coexists, under such a task execution environment, there still remains the possibility that a high urgency process would be delayed by a low urgency process. In other words, it does not satisfy feature (2) above.

In addition, as a method that satisfies both features (1) and (2) above, the non-blocking synchronization method may be given as an example (for example, see "Non-blocking Synchronization and System Design," a paper by Michael Barry Greenwald (Ph.D. Thesis, Stanford University, 1999)). However, in order to apply it, a special hardware is required, and an increase in cost is incurred.

DISCLOSURE OF THE INVENTION

The object of the present invention is to provide a good method of task control and computer program on a processing system or a computer system in which a plurality of flows of control (for example an interrupt processing program and a normal program, or a plurality of tasks) exist in a program.

A further object of the present invention is to provide a good method of task control and computer program on a processing system or a computer system that are capable of suitably performing exclusive access control in parts of a program (critical sections) which cannot be referenced simultaneously by a plurality of tasks.

A further object of the present invention is to provide a good method of task control and computer program on a processing system or a computer system that are capable of suitably performing exclusive access control in a critical section under circumstances where a plurality of task execution environments having distinct scheduling policies exist.

A further object of the present invention is to provide a good method of task control and computer program on a processing system or a computer system that are capable of suitably performing, without requiring special hardware, exclusive access control in a system in which a plurality of scheduling policies coexist.

The present invention is made in consideration of the issues above, and a first aspect thereof is a processing system for performing exclusive access control between a plurality of processes, and is a processing system characterized in that it comprises start timing recording means for recording the timing in which a high urgency process is started, inspecting means for inspecting, upon entering, in the middle of a low urgency process, a critical section that cannot be referenced simultaneously by a plurality of processes, whether or not a high urgency process will be started during execution of the critical section by referencing the start timing mentioned above, and control means for controlling the execution of the critical section according to the result of the inspection.

However, "system" as used herein refers to something in which a plurality of apparatuses (or functional modules realizing specific functions) are logically aggregated, and is regardless of whether or not each apparatus and functional module is present in a single housing (this applies hereinafter).

The control means mentioned above, in order to maintain the consistency of data during execution of a critical section, accepts entry to the critical section if a high urgency process will not be started during execution of the critical section, and performs exclusive access control such that entry to the critical section is delayed if a high urgency process is to begin during execution of the critical section.

Therefore, according to a processing system related to the first aspect of the present invention, exclusive access control can be performed suitably between a plurality of processes without delaying the start of a high urgency process.

In addition, according to a processing system related to the first aspect of the present invention, by reducing the frequency of context switching, overhead is reduced compared to mutex and semaphore in which priority inheritance is not performed.

In addition, according to a processing system related to the first aspect of the present invention, exclusive access control can be performed suitably even between a plurality of task sets whose scheduling is performed according to distinct policies.

In addition, according to a processing system related to the first aspect of the present invention, in a system in which a plurality of operating systems operate simultaneously, exclusive access control between tasks operating on these operating systems, and exclusive access control between operating systems become possible.

In addition, according to a processing system related to the first aspect of the present invention, exclusive access control can be performed suitably, without requiring special hardware, in a system in which a plurality of scheduling policies coexist.

In addition, a second aspect of the present invention is a method of task control on a processing system or a computer system in which a plurality of task execution environments, where scheduling is performed according to distinct policies, exist, and is a method of task control on a processing system or a computer system characterized in that it comprises an execution environment switching means or step for switching between task execution environments, a scheduled time managing means or step for managing a scheduled time at which the next task execution environment switching is to be performed, and a task execution managing means or step for managing the execution of a task under a current task execution environment according to the scheduled time mentioned above.

Here, the task execution managing means or step need only perform exclusive access control of tasks by, when a task that is being executed under the current task execution environment is to enter a critical section that cannot be referenced simultaneously by a plurality of tasks, judging whether or not to enter the critical section depending on whether there is room for the execution time of the critical section in relation to the scheduled time.

More specifically, the task execution managing means or step allows entry to the critical section when there is room for the execution time of the critical section in relation to the scheduled time, but when there is no room, it may instruct the execution environment switching means to switch task execution environments, Here, a context saving means for, at the time of task execution switching by the execution environment switching means or step mentioned above, saving the status of task execution at the time of switching may further be provided.

According to a method of task control on a processing system or a computer system related to the second aspect of the present invention, exclusive access control can be performed suitably even between a plurality of task sets for which scheduling is performed according to distinct policies.

In addition, according to a method of task control on a processing system or a computer system related to the second aspect of the present invention, in a system in which a plurality of operating systems are operating simultaneously, exclusive access control between tasks operating on these operating systems and exclusive access control between the operating systems are made possible.

In addition, according to a method of task control on a processing system or a computer system related to the second aspect of the present invention, as compared to mutex and semaphore, which do not perform priority inheritance, overhead can be reduced by reducing the frequency of context switching.

In addition, according to a method of task control on a processing system or a computer system related to the second aspect of the present invention, exclusive access control can be performed suitably, without requiring special hardware, in a system in which a plurality of scheduling policies coexist.

In addition, a third aspect of the present invention is a computer program written in a computer readable format so that a process for performing exclusive access control between a plurality of processes is executed on a computer system, and is a computer program that is characterized in that it comprises, a start timing recording step for recording the timing in which a high urgency process is to be started, an inspection step for inspecting, upon entering, in the middle of a low urgency process, a critical section that cannot be referenced simultaneously by a plurality of processes, whether or not a high urgency process will be started during execution of the critical section by referencing the start timing mentioned above, and a control step for controlling the execution of the critical section according to the result of the inspection.

In addition, a fourth aspect of the present invention is a computer program in which procedures of task control on a computer system in which a plurality of task execution environments whose scheduling is performed according to distinct policies exist are written in a computer readable format, and is a computer program characterized in that it comprises an execution environment switching means for switching between task execution environments, a scheduled time managing step for managing a scheduled time at which the next task execution environment switching is to be performed, and a task execution managing step for managing the execution of a task under the current task execution environment in accordance with the scheduled time mentioned above.

A computer program related to each of the third and fourth aspects of the present invention is one that defines a computer program written in a computer readable format so as to implement predetermined processes on a computer system. In other words, by installing a computer program related to each of the third and fourth aspects of the present invention on a computer system, a cooperative effect is demonstrated on the computer system and similar effects as those of a method of task control on a processing system or a computer system related to the first and second aspects of the present invention can be achieved.

Further objects, features and advantages of the present invention will become clearer in light of the following detailed description based on modes of the present invention and the appended drawings.

BEST MODES FOR CARRYING OUT THE INVENTION

Hereinafter, a detailed description on modes of the present invention will be given with reference to the drawings.

Figure 1:
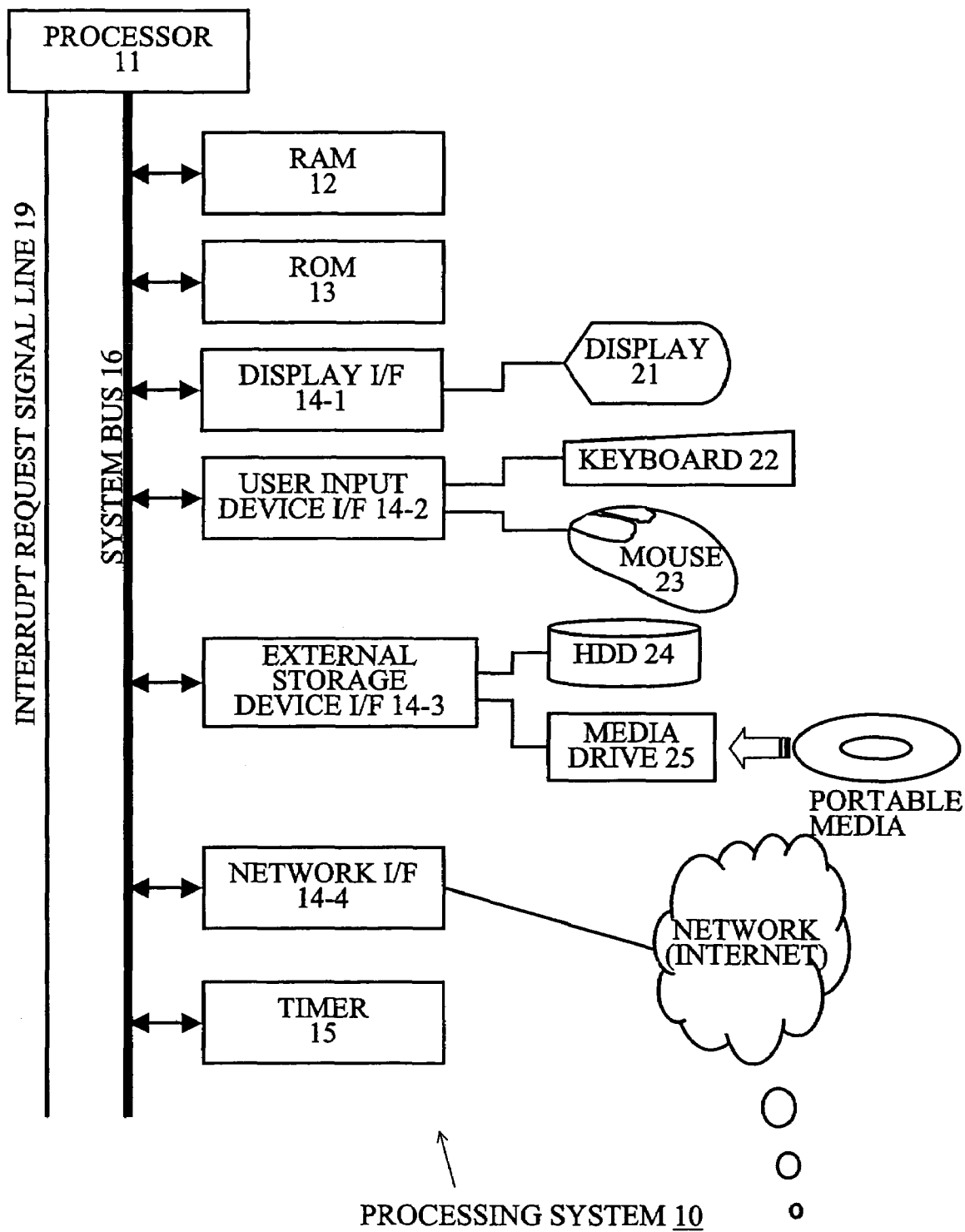
FIG. 1 is a schematic view of the hardware configuration of a processing system 10 used in the implementation of the present invention.

FIG. 1 schematically shows the hardware configuration of a processing system 10 used in the implementation of the present invention. As shown in the same figure, the processing system 10 includes a processor 11, RAM (Random Access Memory) 12, ROM (Read Only Memory) 13, a plurality of input/output devices 14-1, 14-2 . . . , and a timer The processor 11 is the main controller of the processing system 10, and executes various program code under the control of an operating system (OS).

Generally, the unit by which an operating system manages and controls program execution is called a "task." In the processing system 10 related to the present mode, a plurality of tasks are allowed to exist in a program. Therefore, there exist more tasks than the number of the processor 11, which is the element that actually handles calculations.

The operating system executes each task in parallel virtually by frequently switching tasks processed by the processor 11. Each task has a task ID allotted with which it can be distinguished from other tasks. In addition, each task carries out a series of operations, in other words transactions, with respect to data using a data region on a stack.

In addition, in the present mode, a plurality of operating systems can be run simultaneously. These operating systems each constitute a task set having distinct characteristics, and scheduling of tasks is performed according to distinct policies. A description of a task execution environment in the processing system 10 related to the present mode will be given later.

The processor 11 is interconnected with other devices (described later) by a bus 16. Each device on the system bus 16 is given a unique memory address or I/O address, and the processor 11 is able to access predetermined devices by specifying these addresses. The system bus 16 is a common signal transmission path including an address bus, a data bus, and a control bus.

The RAM 12 is a writable memory, and is used to load program code executed by the processor 11 or to temporarily store work data of an executed program. Program code may include, for example, a BIOS (Basic Input/Output System), device drivers for operating the hardware of peripheral devices, operating systems, applications and the like.

The ROM 13 is a non-volatile memory for permanently storing predetermined code and data, and stores, for example, a BIOS, a self-diagnostic program (Power On Self Test: POST) and the like.

The input/output device 14 includes a display interface 14-1 for connecting a display 21, a user input device interface 14-2 for connecting user input devices such as a keyboard 22 and a mouse 23, an external storage device interface 14-3 for connecting external storage devices such as a hard disk 24 and a media drive 25, a network interface card (NIC) 14-4 for connecting with an external network, and the like.

The display interface 14-1 is a dedicated interface controller for actually processing draw commands issued by the processor 11. Draw data processed at the display interface 14-1 is, for example, outputted on screen by the display 21 after being once written in a frame buffer (not shown).

The HDD 24 is an external storage device (known) in which a magnetic disk as a memory carrier is fixedly mounted, and is superior to other external storage devices in terms of storage capacity, data transfer rate and the like. Ordinarily, program code of an operating system, application programs, device drivers and the like to be executed by the processor 11 are stored in the HDD 24 in a non-volatile manner. The placing of software programs on the HDD 24 in an executable state will be called an installation of a program to a system. For example, an application program designed so that a plurality of tasks exist and an operating system which realize the present invention may be installed on the HDD 24.

The media drive 25 is a device into which portable media such as CDs (Compact Discs), MOs (Magneto-Optical discs), DVDs (Digital Versatile Discs) and the like are loaded, and which is for accessing the data recording surface thereof.

Portable media are mainly used for making back-ups of software programs, data files and the like as data in computer readable formats, or for the purpose of transferring them between systems (in other words, includes sales, circulation and distribution). For example, it is possible to physically circulate and distribute application programs designed so that a plurality of tasks exist and operating systems for realizing the present invention between a plurality of devices using these portable media.

The network interface 14-1, in accordance with predetermined communications protocols such as Ethernet (registered trademark) and the like, can connect the system 10 to local networks such as a LAN (Local Area Network), or, further, to wide area networks such as the Internet.

In a network, a plurality of host terminals (not shown) are connected in a transparent state, and a distributed computing environment is established. In a network, distribution of software programs and data content can be performed. For example, application programs designed so that a plurality of tasks exist and operating systems that realize the present invention can be downloaded via network.

Interrupt levels are assigned to each of the input/output devices 14-1, 14-2 . . . , and in response to the occurrence of a predetermined event (for example, GUI processing of keyboard input, a mouse click, and the like, or the completion of data transfer in the hard disk), the processor 11 can be notified via an interrupt request signal line 19. The processor 11, in response to such an interrupt request, executes the corresponding interrupt handler.

The timer 15 is a device that generates a timer signal in a predetermined cycle. An interrupt level is assigned to the timer 15, too, and generates periodic interruptions with respect to the processor 11 via the interrupt request signal line 19.

In addition, an example of such a processing system 10 as shown in FIG. 1 is a compatible machine for or a successor machine to IBM's 30 personal computer "PC/AT (Personal Computer/Advanced Technology)." Of course, it is also possible to apply a computer having a different architecture as the processing system 10 related to the present mode.

In the present mode, a plurality of operating systems run simultaneously. Each of these operating systems constitutes a task set having distinct characteristics and the scheduling of tasks is carried out according to distinct policies.

Figure 2:
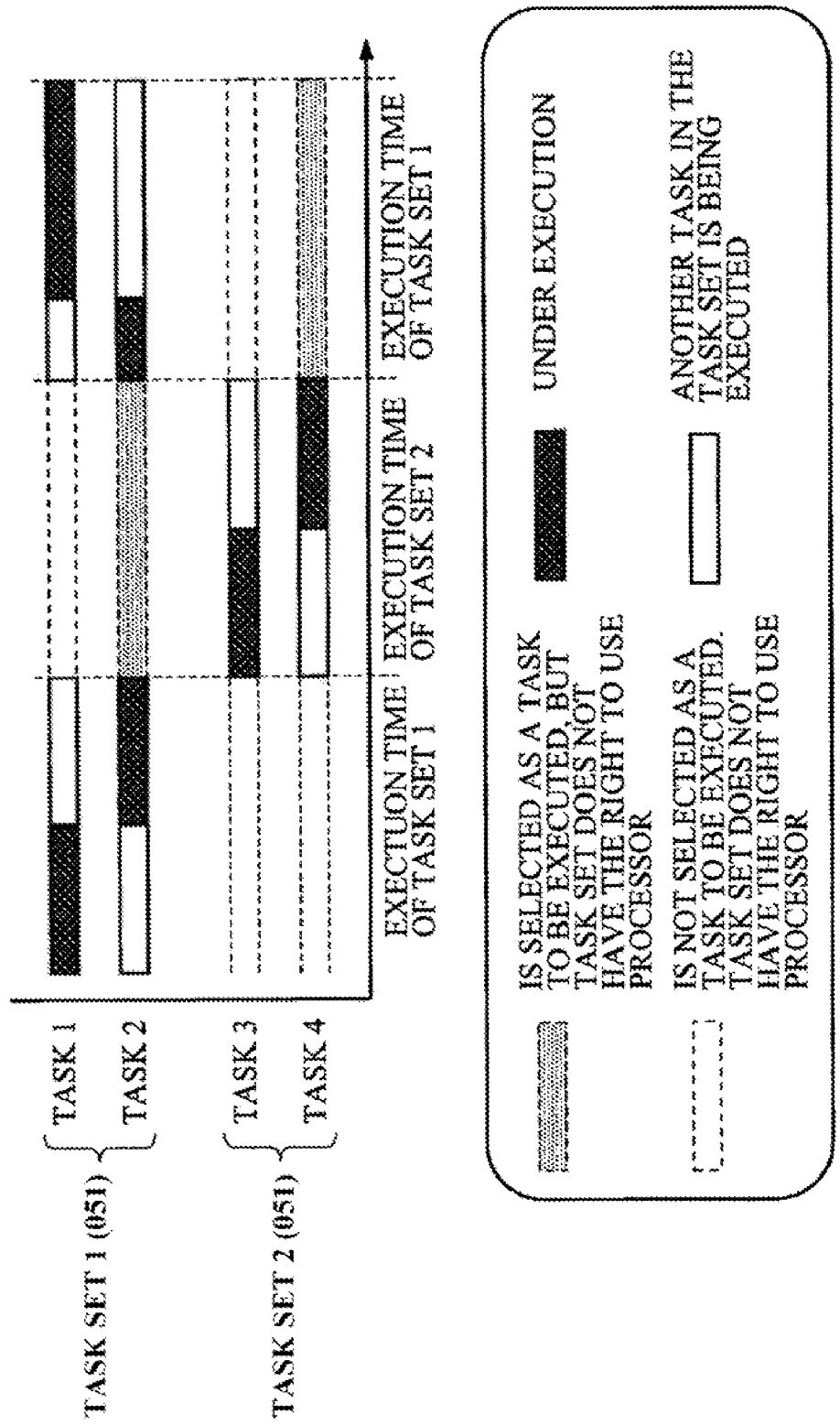
FIG. 2 is a schematic view illustrating a plurality of operating systems running simultaneously.

FIG. 2 schematically illustrates a plurality of operating systems running simultaneously. In the example shown in the same figure, two operating systems OS 1 and OS 2 are running simultaneously on a single processing system 10. Under the task execution environment provided by OS 1, task 1 and task 2 are executed. In addition, under the task execution environment provided by OS 2, task 3 and task 4 are executed. Task 1 and task 2 executed on OS 1 constitute task set 1, and task 3 and task 4 executed on OS 2 constitute task set 2.

In the processing system 10, by way of context switching, for example, system usage rights are given alternately to OS 1 and OS 2. The period during which the context is switched to OS 1 corresponds to an execution period for task set 1. And during the execution period for task set 1, in accordance with the scheduling that OS 1 has, exclusive access control between task 1 and task 2, in other words task set 1, is carried out. As a method of exclusive access control, mutex, semaphore, a priority inheritance protocol or other known or unique methods may be applied.

Similarly, the period during which the context is switched to OS 2 corresponds to an execution period for task set 2. And during the execution period for task set 2, in accordance with the scheduling that OS 2 has, exclusive access control between task 3 and task 4, in other words task set 2, is carried out. As a method of exclusive access control, mutex, semaphore, a priority inheritance protocol or other known or unique methods may be applied.

The present invention realizes exclusive access control in such a system as shown in FIG. 2 in which a plurality of task sets, whose scheduling is carried out according to distinct policies, coexist.

Figure 3:
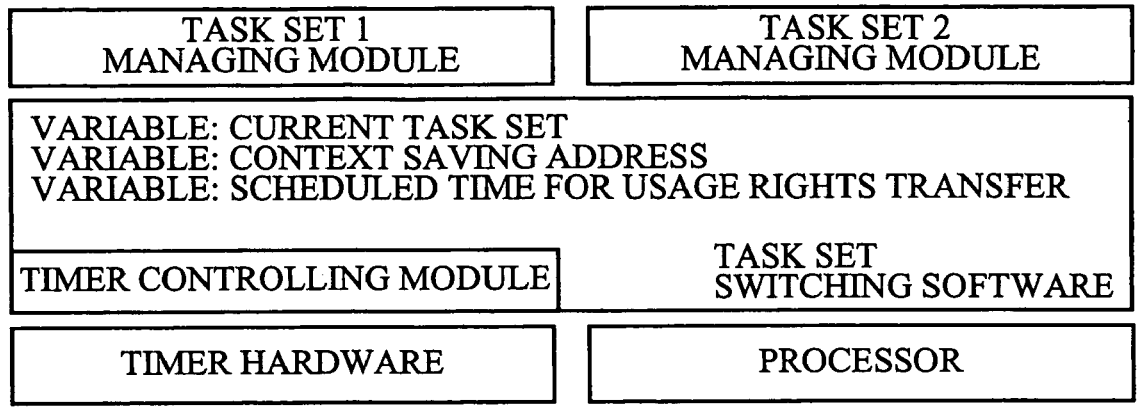
FIG. 3 is a schematic view of the configuration of a task execution environment related to a mode of the present invention.

In FIG. 3, the configuration of a task execution environment related to a mode of the present invention is shown schematically. As shown in the same figure, a plurality of task sets, whose scheduling is carried out according to distinct policies, coexist.

The managing module for task set 1 and the managing module for task set 2 correspond to OS 1 and OS 2, respectively, and perform exclusive access control of task set 1 and task set 2 according to predetermined scheduling policies within periods in which system usage rights are granted.

Task set switching software is a software module for carrying out overall management of operating systems such as context switching between a plurality of operating systems, and is capable of managing from which task set an execution task is to be selected. The task set switching software carries out the re-assigning of system usage rights (in other words, task set switching) in appropriate timings using a timer module for acquiring time information from the timer 15.

In the present mode, the task set switching software holds the following three variables in order to suitably manage the switching of task sets.

(1) Current Task Set:

A variable in which a value for identifying the task set to which usage rights of the processor are currently assigned is stored.

(2) Context Saving Address:

In re-assigning usage rights, there is a need to save the state of the processor at that point in time. The variable "context saving address" is a variable for holding the address of this saved region.

(3) Scheduled Time for Usage Rights Transfer:

A variable for holding the time at which usage rights are to be transferred next. This variable is a variable from which the managing module of each task set is capable of reading a value.

Figure 4:
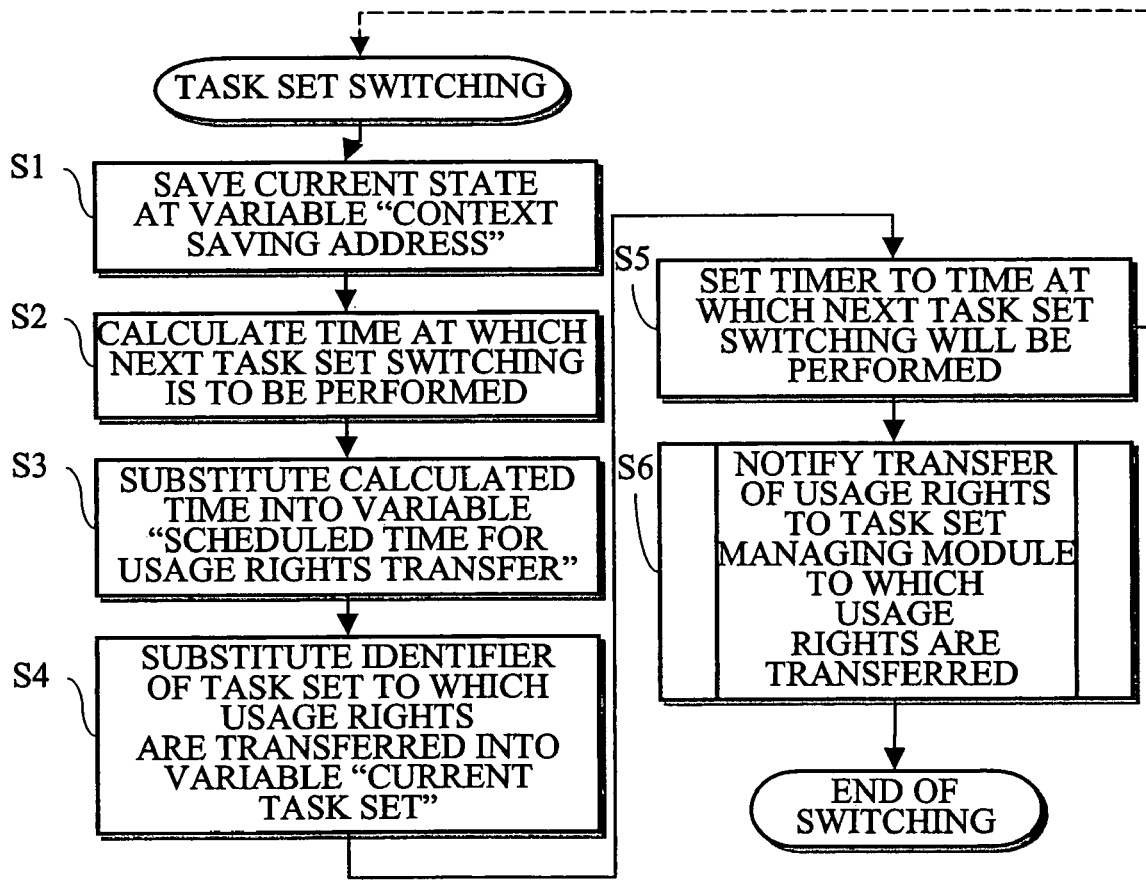
FIG. 4 is a flowchart showing a procedure for task set switching software to switch task sets.

In FIG. 4, a procedure for the task set switching software to switch task sets is shown in the form of a flowchart.

In switching task sets, first, the current state is saved in the variable "context saving address" mentioned above (step S1). More specifically, the saving of state as mentioned here refers to the evacuation of the register values of the processor 11 and the memory image of the RAM 12.

Next, the time at which the switching of task sets is to be performed next is calculated (step S2). Then, the calculated time is substituted into the variable "scheduled time for usage rights transfer" mentioned above (step S3).

Further, the identifier of the task set to which usage rights are to be transferred is substituted into the variable "current task set" mentioned above (step S4).

Subsequently, the timer is set to the time at which task switching is next performed calculated in the preceding step S2 (step S5). This timer makes an interruption occur at the time that is set. Through this interruption, the next task set switching process is activated.

Lastly, the transfer of usage rights is notified to the task set managing module to which usage rights are to be transferred (step S6).

Figure 5:
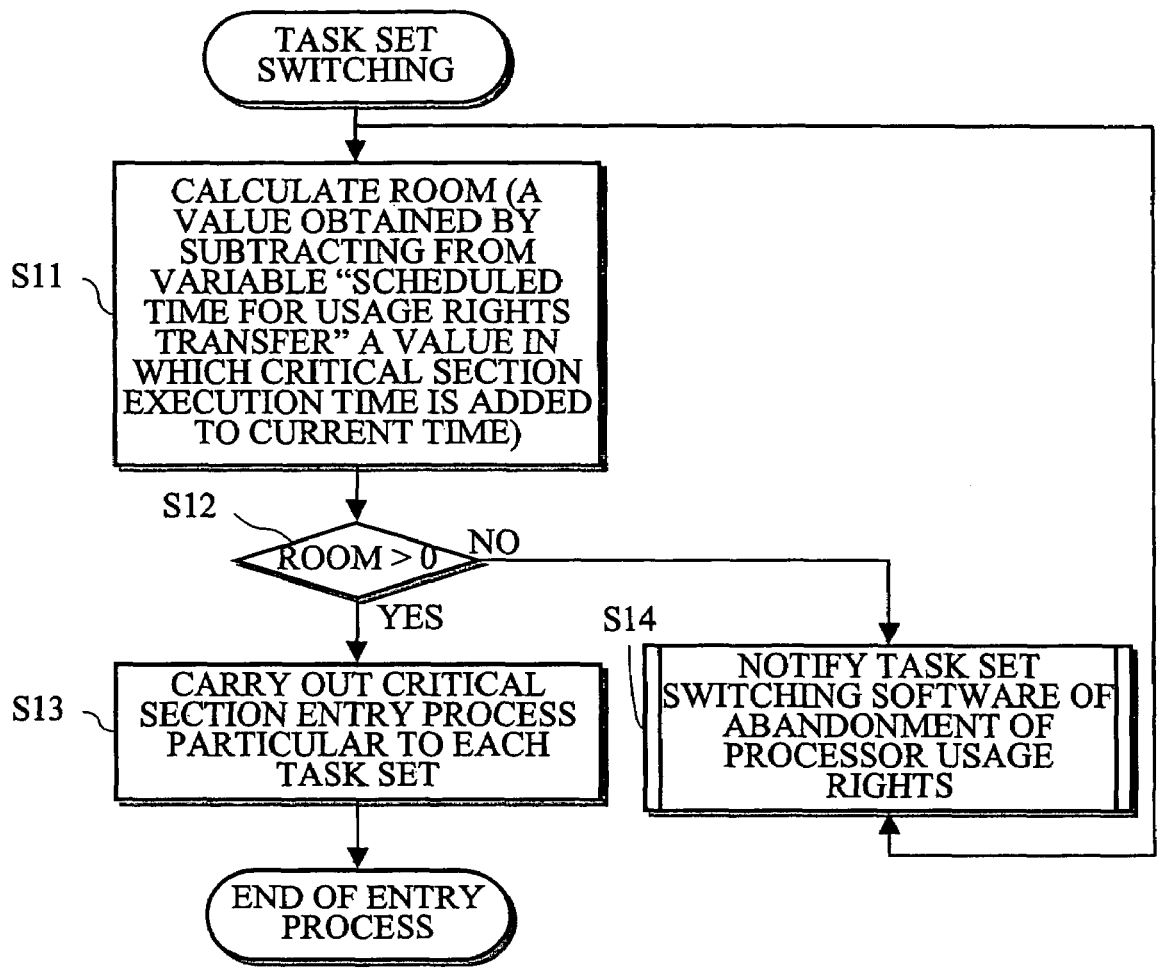
FIG. 5 is a flowchart showing a procedure carried out when a task that belongs to a task set enters a critical section.
Figure 6:
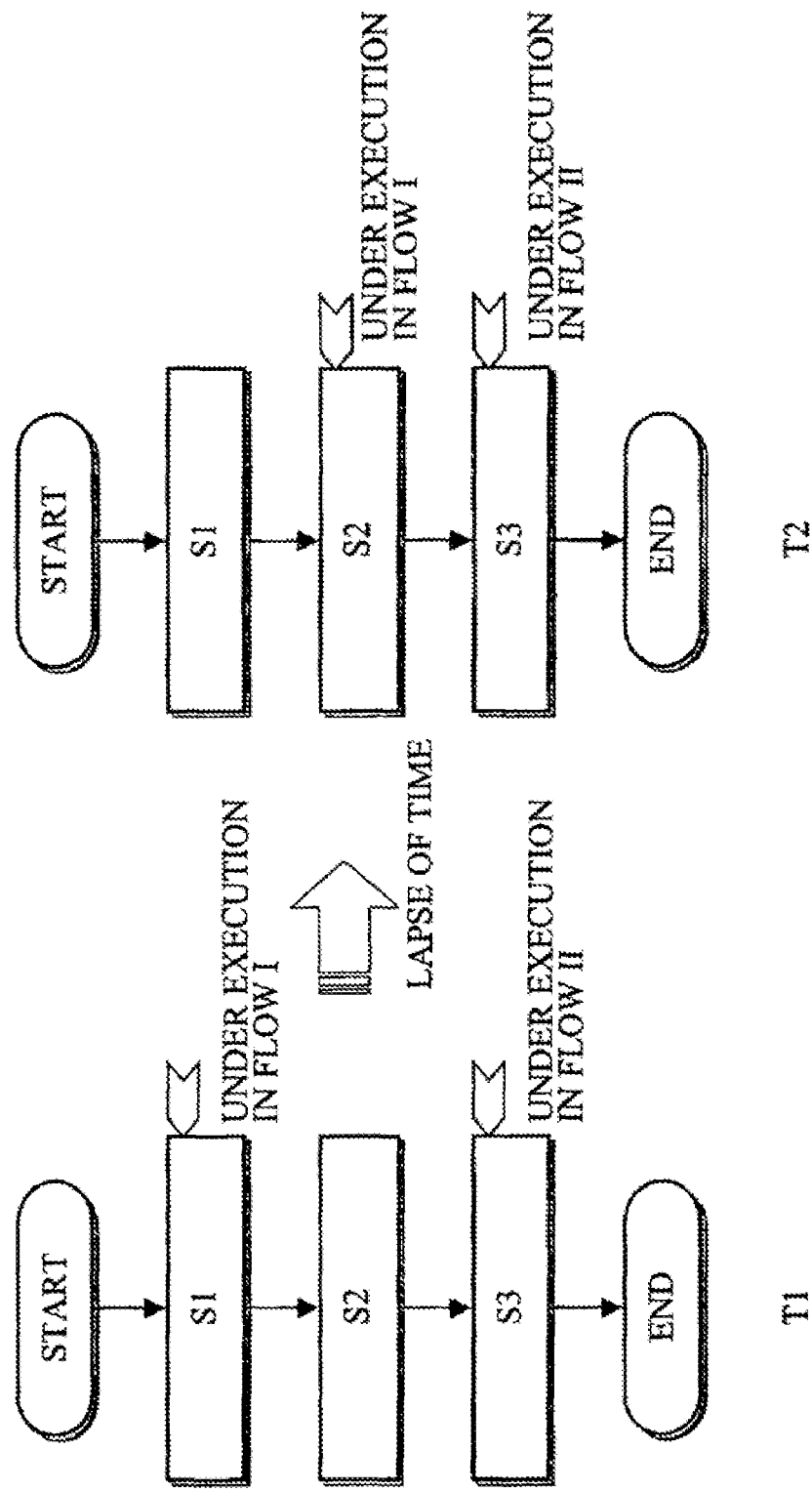
FIG. 6 is a diagram showing a flow of processes, in other words a flowchart, of a program in which a plurality of points currently under execution exist.
Figure 7:
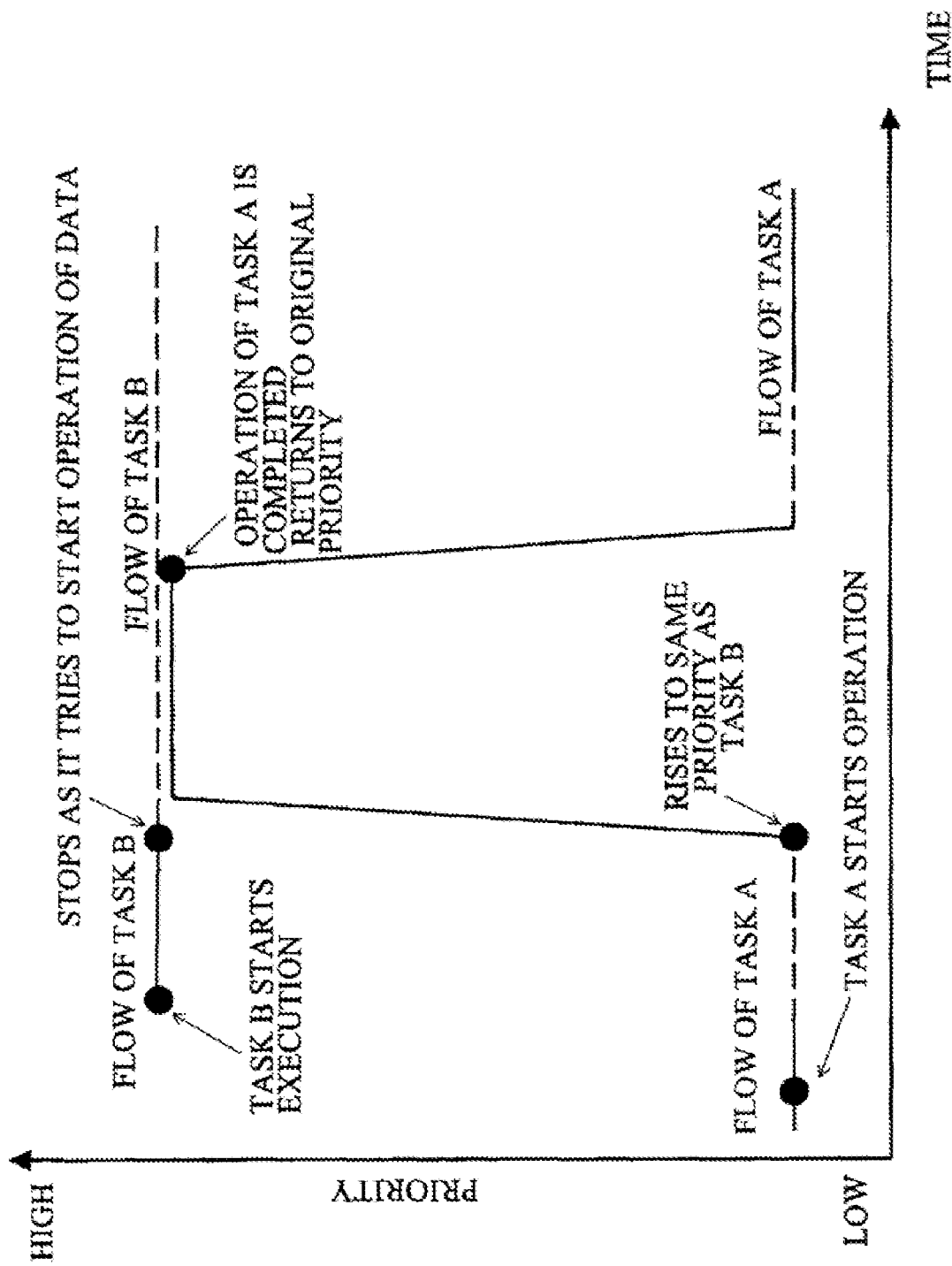
FIG. 7 is a diagram illustrating the operation of a priority inheritance protocol.

In FIG. 5, a procedure carried out by a task that belongs to a certain task set upon entering a critical section is shown in the form of a flowchart.

A task managing module for managing the execution of a task in the current task set references the variable "scheduled time for usage rights transfer" held by the task set switching software, and determines the presence of room for task execution (step S11). Room as used herein corresponds to a value arrived at by subtracting a value, in which the critical section execution time is added to the current time, from the scheduled time for usage rights transfer.

Subsequently, it is determined if this room is greater than zero step S12).

If the room is greater than zero, a critical section entry process particular to each task set is carried out (step S13).

On the other hand, when the room is equal to or less than zero, if the critical section is entered, there arises a contradiction where operation on the same data by other tasks is excluded, while at the same time the process of the critical section does not finish by the next task set switching time. For this reason, the task set managing module notifies to the task set switching software the abandonment of processor usage rights.

Through this notification, control is shifted to a task in a different task set in the middle of a process (let this be "process A"). Process A reaches completion when the usage rights of the processor 11 are granted again to the task set to which the task that was executing process A belongs.

For example, when a critical section is entered in the middle of a low urgency process in a task under execution in a current task set, the scheduled time at which the next task set switching is to be performed is referenced, and it is inspected whether a high urgency process will be started during execution of the critical section. And if one will not be started, the critical section is entered, but if it will be started, control is carried out whereby entry to the critical section is postponed until the high urgency process is completed.

Therefore, exclusive access control can be suitably performed between a plurality of processes without delaying the start of a high urgency process between a plurality of task sets whose scheduling is performed according to distinct policies.

Supplment

Thus, the present invention has been described in detail with reference to specific modes. However, it is obvious that those skilled in the art may make modifications and substitutions to the modes above without departing from the scope of the present invention. In other words, the present invention has been disclosed in the form of examples, and contents of the present invention are not to be construed in a limiting manner. In order to determine the scope of the present invention, the scope of claims described later should be taken into consideration.

INDUSTRIAL APPLICABILITY

According to the present invention, a method of task control and computer program on a superior processing system or a computer system of a type in which a plurality of flows of control (for example, an interrupt processing program and a normal processing program, or a plurality of tasks, and the like) exist in a program can be provided.

In addition, according to the present invention, a method of task control and computer program on a superior processing system or a computer system in which exclusive access control can be performed suitably in a portion of a program (critical section) that cannot be referenced simultaneously by a plurality of tasks can be provided.

In addition, according to the present invention, a method of task control and computer program on a superior processing system or a computer system in which exclusive access control in a critical section can be performed suitably under conditions where a plurality of task execution environments having distinct scheduling policies exist can be provided.

In addition, according to the present invention, a method of task control and computer program on a superior processing system or a computer system in which exclusive access control can be performed suitably, without requiring any special hardware, in a system in which a plurality of scheduling policies coexist can be provided.

According to the present invention, exclusive access control can be performed suitably between a plurality of processes without delaying the start of a high urgency process.

In addition, according to the present invention, by reducing the frequency of context switching, overhead can be reduced compared to mutex and semaphore, which do not carry out priority inheritance.

In addition, according to the present invention, exclusive access control can be performed suitably even between a plurality of task sets whose scheduling is performed according to distinct policies.

In addition, according to the present invention, in a system in which a plurality of operating systems operate simultaneously, exclusive access control between tasks operating on these operating systems, and exclusive access control between operating systems become possible.

As opposed to non-blocking synchronization, the present invention is capable of attaining the effects above without using any special hardware.

The invention claimed is:

1. A computer processing system for scheduling execution of a plurality of task execution environments, the processing system comprising:
   means for executing a first task execution environment and a second task execution environment, the first task execution environment having a first critical program section that references and updates a value of a variable stored in memory, and the second task execution environment having a second critical program section that references and updates the value of the variable stored in memory;
   means for switching execution from the first task execution environment to the second task execution environment;
   means for determining a scheduled time at which execution switches from executing the first task execution environment to executing the second task execution environment; and
   means for managing execution of the first task execution environment based on the scheduled time, comprising:
      means for determining, when execution of the first environment reaches the first critical program section, whether sufficient time is available to complete execution of the first critical program section prior to the scheduled time;
      means for terminating execution of the first task execution environment without completing execution of the first critical program section, and for instructing the means for switching to switch from execution of the first task execution environment to execution of the second task execution environment, when it is determined that sufficient time is not available to complete execution of the first critical program section prior to the scheduled time; and
      means for allowing execution of the first critical program section when it is determined that sufficient time is available to complete execution of the first critical program section prior to the scheduled time.

2. The computer processing system according to claim 1, further comprising means for saving, upon switching from the first task execution environment, a state of task execution at the time of the switching.

3. A computer-implemented method for scheduling execution of a plurality of task execution environments, the method comprising:
   executing a first task execution environment and a second task execution environment, the first task execution environment having a first critical program section that references and updates a value of a variable stored in memory, and the second task execution environment having a second critical program section that references and updates the value of the variable stored in memory;
   determining a scheduled time at which execution switches from execution of the first task execution environment to execution of the second task execution environment; and
   managing execution of the first task execution environment based on the scheduled time, the managing comprising:
      determining, when execution of the first task execution environment reaches the first critical program section, whether sufficient time is available to complete execution of the first critical program section prior to the scheduled time;
      terminating execution of the first task execution environment without completing execution of the first critical program section, and instructing switching from execution of the first task execution environment to execution of the second scheduled task execution environment, when it is determined that sufficient time is not available to complete execution of the first critical program section prior to the scheduled time; and
      allowing execution of the first critical program section when it is determined that sufficient time is available to complete execution of the first critical program section prior to the scheduled time.

4. The method of claim 3, further comprising saving, upon switching from the first task execution environment, a state of task execution at the time of the switching.

5. A computer-readable storage medium storing a computer program which, when executed by a computer system, causes the computer system to perform a method for scheduling execution of a plurality of task execution environments, the method comprising:
   executing a first task execution environment and a second task execution environment, the first task execution environment having a first critical program section that references and updates a value of a variable stored in memory, and the second task execution environment having a second critical program section that references and updates the value of the variable stored in memory;
   determining a scheduled time at which execution switches from execution of the first task execution environment to execution of the second task execution environment; and
   managing execution of the first task execution environment based on the scheduled time, the managing comprising:
      determining, when execution of the first task execution environment reaches the first critical program section, whether sufficient time is available to complete execution of the first critical program section prior to the scheduled time;
      terminating execution of the first task execution environment without completing execution of the first critical program section, and instructing switching from the first task execution environment to the second scheduled task execution environment, when it is determined that sufficient time is not available to complete execution of the first critical program section prior to the scheduled time; and
      allowing execution of the first critical program section when it is determined that sufficient time is available to complete execution of the first critical program section prior to the scheduled time.

* * * * *